United States Patent [19]

Postma

[11] Patent Number: 4,978,568

[45] Date of Patent: Dec. 18, 1990

[54] FLEXIBLE WRITING SURFACE

[75] Inventor: Robert C. Postma, Greensboro, N.C.

[73] Assignee: Hach Associates, Inc., Winston Salem, N.C.

[21] Appl. No.: 313,801

[22] Filed: Feb. 22, 1989

Related U.S. Application Data

[63] Continuation-in-part of Ser. No. 229,908, Aug. 8, 1988.

[51] Int. Cl.[5] .................................................. B32B 9/00

[52] U.S. Cl. .................................... 428/192; 428/196; 428/212; 428/423.1; 428/500; 428/515; 428/908; 434/408; 434/422; 434/423; 434/424; 434/425

[58] Field of Search ............ 428/192, 196, 212, 423.1, 428/500, 518, 908; 434/408, 422, 423, 424, 425

[56] References Cited

U.S. PATENT DOCUMENTS

| | | | |
|---|---|---|---|
| 2,881,538 | 4/1959 | Lewis | 35/62 |
| 3,300,429 | 1/1967 | Glavis et al. | 260/29.6 |
| 3,497,969 | 3/1970 | Schwoegler | 35/66 |
| 3,642,562 | 2/1972 | Kawaguchi | 161/88 |
| 3,922,457 | 11/1975 | Barnwell et al. | 428/207 |
| 4,052,525 | 10/1977 | Ide et al. | 428/412 |
| 4,066,820 | 1/1978 | Kelly et al. | 428/483 |
| 4,138,523 | 2/1979 | Katsurayama et al. | 428/216 |

*Primary Examiner*—Patrick Ryan
*Attorney, Agent, or Firm*—Richard E. Jenkins

[57] ABSTRACT

A flexible writing surface including a coated flexible substrate having a dust collecting cuff around the perimeter thereof to prevent the scattering of chalk dust during use.

9 Claims, 1 Drawing Sheet

FLEXIBLE WRITING SURFACE

RELATED APPLICATION

This application is a continuation-in-part application of Ser. No. 229,908, filed Aug. 8, 1988, and entitled "Flexible Writing Surface".

TECHNICAL FIELD

The present invention relates to writing surfaces and more particularly to a flexible chalkboard which can be easily transported and stored and can be utilized on the surface of a floor or the like without the scattering of chalk dust particles thereon.

BACKGROUND ART

Conventional chalkboards typically consist of a pigmented coating composition applied to a rigid surface such as metal, slate, dense fiberboard or plywood. The pigmented coating composition usually contains a quantity of a mild abrasive material such as finely divided Carborundum so as to provide the roughness necessary for generating a chalk mark. Pigmented coating compositions such as rubber latex paints containing abrasive material have also been applied to flexible supports or sheets made of a cellulosic material (such as latex impregnated paper) in order to form a flexible chalkboard. The flexible sheets have a pressure sensitive adhesive on the side opposite the pigmented coating so that the flexible chalkboard can be secured to a desired surface. Such a flexible chalkboard is disclosed in U.S. Pat. No. 3,497,969.

A need still exists, however, for a writing surface that is easily transportable and storable and that can be utilized on the surface of a floor or the like without the scattering of chalk dust particles. The present invention possesses these qualities and is believed to satisfy a long-felt need for such a writing surface.

DISCLOSURE OF THE INVENTION

The flexible chalkboard of the invention comprises a flexible surface or support provided with a coating composition thereon so as to provide a flexible and durable writing surface which facilitates the application and removal of chalk markings. Also, the flexible chalkboard is easily transportable and storable and is provided with a dust-collecting cuff or retainer around the perimeter of the writing surface so as to prevent the scattering of chalk dust particles while the flexible chalkboard is in use.

It is therefore an object of the present invention to provide an improved flexible chalkboard that is durable and easy to use.

It is still another object of the present invention to provide a flexible chalkboard that is easily transportable and storable and that prevents the scattering of chalk dust particles during use thereof.

BRIEF DESCRIPTION OF THE DRAWINGS

Some of the objects of the invention having been stated, other objects will become evident as the description proceeds when taken in connection with the accompanying drawings, in which.

BEST MODE FOR CARRYING OUT THE INVENTION

Figure 1:
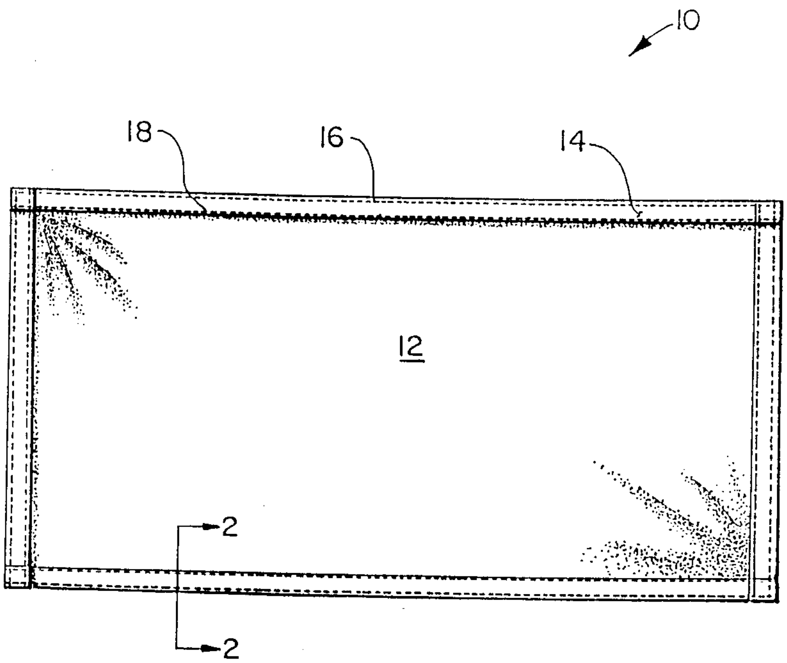
FIG. 1 is a top plan view of the flexible writing surface of the present invention.
Figure 2:
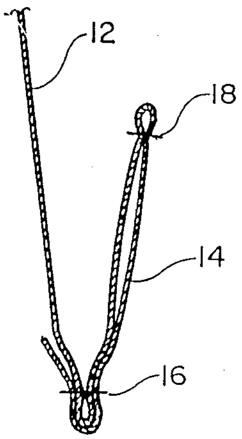
FIG. 2 is a cross-sectional view of the flexible writing surface of the present invention taken on lines 2—2 of FIG. 1.

Referring now more specifically to the drawings, a preferred embodiment of the flexible writing surface of the present invention is shown in FIGS. 1 and 2. With specific reference now to FIG. 1, a flexible chalkboard 10 is shown having a coated substrate writing surface 12 surrounded by a dust collecting cuff 14. As can best be seen in FIG. 2, dust collecting cuff 14 preferably consists of a portion of the flexible writing surface that has been folded and turned back on itself so as to form a dust-collecting gutter or trough although other dust collecting means are contemplated by the invention. Stitches 16 serve to maintain the trough-like shape of cuff 14 while stitches 18 serve to better secure together the overlapping layers of writing surface 12 which form cuff 14. Dust collecting cuff 14 extends entirely around the perimeter of writing surface 12 so that flexible chalkboard 10 may be utilized on the floor as well as in a vertical position without the inadvertent scattering of chalk dust particles.

It should be emphasized that the dust collecting "cuff" can be fabricated in a variety of ways from a variety of materials, and it need not be an integral part of the actual writing surface but may be attached thereto. The dust collecting cuff also need not extend around the entire perimeter of the writing surface but may extend around selected portions thereof (e.g., along one side of the writing surface).

The substrate or support of the present invention may be a flexible fabric or other sheet material. The support preferably has a texture suitable for abrading a piece of chalk applied thereto and can be of any pattern or design. The preferred substrate of the present invention is a textured vinyl cloth having a stippled pattern (such as stippled wall coverings well known in the wall covering field). This type of substrate may be comprised of a single flexible textured material or of a textured cloth with a flexible backing (such as an Osnaburg backing) utilized in many current wall coverings.

The support or substrate can be of any desired surface area and typically has a thickness of between about 0.05 mm and 0.20 mm with a preferred thickness of of about 0.1 mm. The coating composition applied to the writing surface of the substrate preferably comprises a polymeric composition such as a urethane polymeric composition or an acrylic polymeric composition. However, the coating composition can be any composition that will adhere to the flexible substrate so as to provide a durable chalk writing and marking surface. The coating composition can be applied to the substrate by coating, dipping, spraying or any other method well known in the art. Preferably, from about 5 to 7 ounces of the coating composition is applied to every 2000 square inches of writing surface.

The coating composition applied to the substrate or support is typically transparent so that any design or configuration on the substrate will be visible by a user of the flexible chalkboard. Any desired design or any color may be drawn, painted, printed or otherwise applied to the substrate prior to application of the polymeric coating so that the chalkboard can be utilized as a graph, chart, drawing surface or other learning or information center to facilitate, for example, the development of writing, alphabet and artistic skills.

The flexible chalkboard of the invention is suitable for both outdoor and indoor use and can easily be rolled up and transported or stored without damage to the writing surface. The flexible chalkboard has no sharp edges and is safe for children of all ages. The present chalkboard can be utilized on the floor, on a table or hung or displayed on a wall. The dust-collecting cuff of the chalkboard prevents the scattering of chalk dust particles during use. It is believed that the chalkboard is particularly effective in attracting and holding the attention of young children and encourages sharing among children since it can typically be adapted to accommodate six or more users.

Although it is preferred to utilize chalk as a writing instrument with the invention, it should be noted that any erasable or washable marker well known in the art can also be utilized with the present flexible writing surface so long as it is determined that the particular marker will not permanently stain the coating composition of the writing surface.

It will be understood that various details of the invention may be changed without departing from the scope of the invention. Furthermore, the foregoing description is for the purpose of illustration only, and not for the purpose of limitation—the invention being defined by the following claims.

What is claimed is:

1. A flexible writing surface comprising a four-sided flexible sheet material having a coating composition thereon characterized by its adherence to said flexible sheet material so as to provide a durable chalk writing and marking surface thereon, said flexible writing surface further comprising flexible dust collecting means extending along and adjacent to at least two sides of said flexible sheet material.

2. A flexible writing surface according to claim 1 wherein the sheet material is a flexible textured vinyl fabric.

3. A flexible writing surface according to claim 1 wherein said vinyl fabric has a stippled pattern.

4. A flexible writing surface according to claim 1 wherein the coating composition is a polymeric composition.

5. A flexible writing surface according to claim 1 wherein the polymeric composition is a urethane polymeric composition.

6. A flexible writing surface according to claim 1 wherein the polymeric composition is an acrylic polymeric composition.

7. A flexible writing surface according to claim 1 wherein the flexible sheet material has a thickness of between about 0.05 and 0.20 mm.

8. A flexible writing surface according to claim 1 wherein said dust-collecting means comprises a cuff defined by the edge of said sheet material having been turned back upon itself.

9. A flexible writing surface comprising a four-sided flexible sheet material having a coating composition thereon characterized by its adherence to said flexible sheet material so as to provide a durable chalk writing and marking surface thereon, said flexible writing surface further comprising a flexible dust collecting cuff extending around the entire perimeter of said flexible sheet material.

* * * * *